United States Patent Office 3,194,435
Patented July 13, 1965

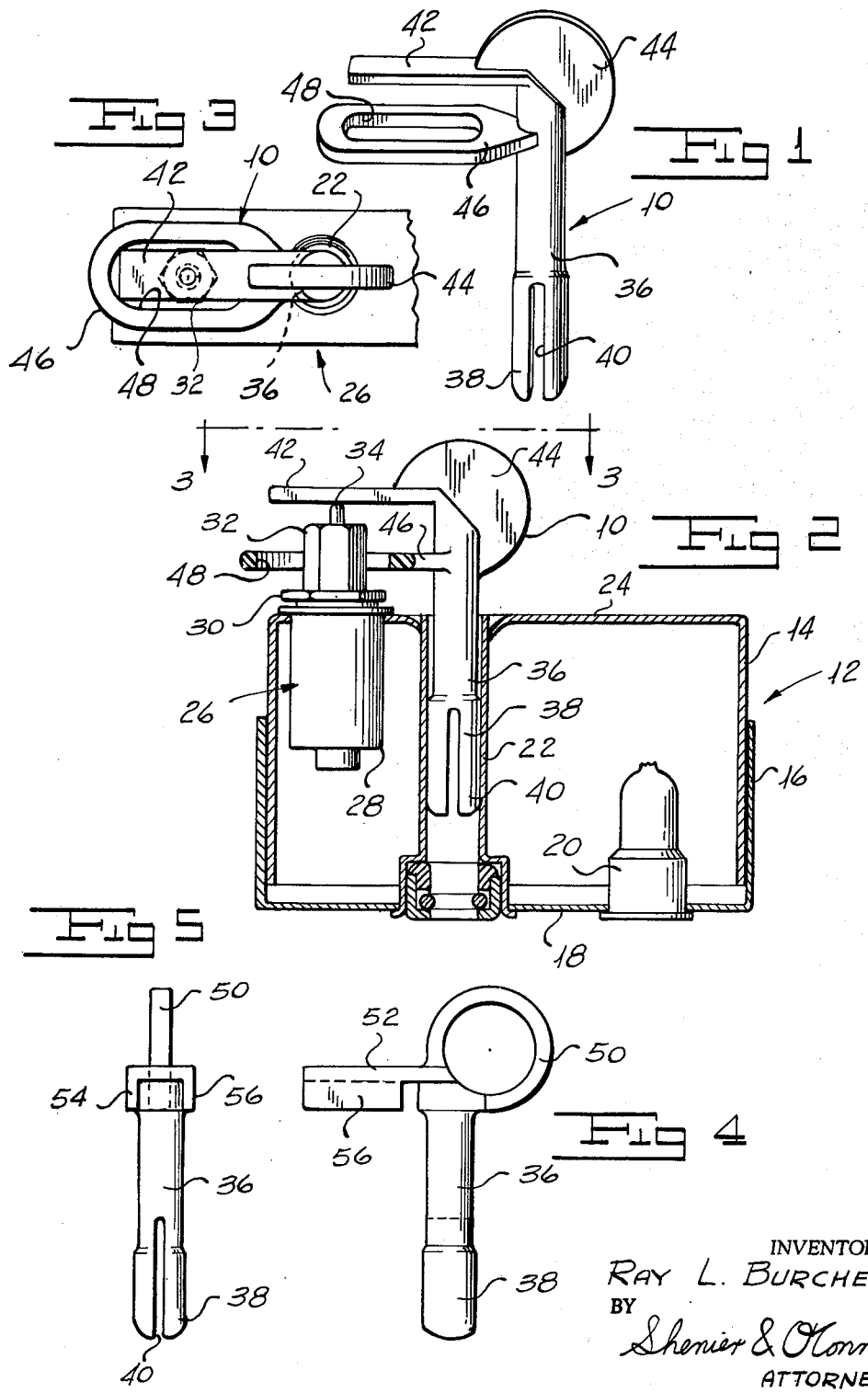

3,194,435
VALVE SHUT-OFF DEVICE FOR GAS
FUEL RESERVOIR
Ray L. Burchett, East Orange, N.J., assignor to Jacques
Kreisler Manufacturing Corporation, North Bergen,
N.J., a corporation of New Jersey
Filed Aug. 5, 1963, Ser. No. 299,972
13 Claims. (Cl. 222—3)

My invention relates to a valve shut-off device for a gas fuel reservoir and more particularly to a device for holding the valve of a gas lighter reservoir closed to facilitate the handling thereof before final assembly and during shipment and to permit ready assembly of the reservoir in a lighter.

There are known in the prior art gas lighters provided with reservoirs for holding supplies of liquefied gas. Gas-releasing valves are mounted in the reservoir wall to permit release of gas when the lighter is operated. Most of the gas lighters known in the art employ normally open valves which are held closed by a snuffer which is lifted in response to operation of the lighter. When the snuffer is lifted the pressure of the gas within the reservoir moves the valve to its open position to permit the escape of gas which is ignited to provide the flame.

For most convenient and expeditious use of reservoirs for gas lighters, it is desirable that they be filled with liquefied gas for shipment and before they are finally assembled into the lighter. To permit the filled reservoirs to be shipped and handled before final assembly where a normally open valve is used, some means must be provided for holding the valve closed. Most of these valve assemblies of the prior art are provided with flame height adjusting mechanisms which can be operated to close the valve entirely. If this is done then when the reservoir is to be assembled in the lighter, this means must again be operated to open the valve and it must be adjusted to provide the precise factory flame height adjustment. It will be appreciated that this is a tedious and time-consuming operation which considerably slows assembly of the lighter.

I have invented a valve shut-off device for a gas fuel reservoir which permits a filled reservoir to be handled and shipped without danger of the gas escaping. My device permits the ready assembly of the reservoir into a lighter with the required factory flame height adjustment. My shut-off device is adapted to be manually applied and removed from a reservoir in a rapid and expeditious manner. My device is extremely simple in construction and is inexpensive to manufacture.

One object of my invention is to provide a valve shut-off device for a gas fuel reservoir which permits a filled reservoir to be handled and shipped.

Another object of my invention is to provide a simple valve shut-off device for closing the valve of a gas fuel reservoir without disturbing the factory flame height adjustment.

A further object of my invention is to provide a valve shut-off device for a gas fuel reservoir, which device can be manually applied to and removed from the reservoir in a rapid and expeditious manner.

A still further object of my invention is to provide a valve shut-off device for a gas fuel reservoir which is simple in construction and inexpensive to manufacture.

Other and further objects of my invention will appear from the following description.

In general my invention contemplates the provision of a valve shut-off device for a gas fuel reservoir including means which is frictionally received by the flint feed assembly tube of the reservoir. In response to positioning of the device in this tube, an arm engages the stem of the normally open valve to close the valve. Auxiliary means prevents accidental movement of the device to a position at which the valve opens.

In the accompanying drawings which form part of the instant specification and which are to be read in conjunction therewith and in which like reference numerals are used to indicate like parts in the various views:

FIGURE 1 is a perspective view of one form of my valve shut-off device.

FIGURE 2 is a sectional view of a gas fuel reservoir to which the form of my device shown in FIGURE 1 has been applied.

FIGURE 3 is a top plan view of the form of my device shown in FIGURES 1 and 2 with part of the gas tank to which it is applied broken away and taken along the line 3—3 of FIGURE 2.

FIGURE 4 is a side elevation of an alternate form of my valve shut-off device.

FIGURE 5 is an end view of the form of my valve shut-off device shown in FIGURE 4.

Referring now to FIGURES 1 to 3 of the drawings, my valve shut-off device indicated generally by the reference character 10 is adapted to be applied to a gas fuel reservoir indicated generally by the reference character 12 made up of an upper section 14 and a lower section 16 which are telescoped together and provided with a gas-tight seal by any suitable means such as by brazing. Reservoir 12 comprises a base 18 in which a refill valve 20 of any suitable type known to the art is mounted. A housing 22 extends from the base 18 and up through the top 24 of the reservoir 12. The housing 22 may, for example, be tubular and is adapted to receive a flint feeding mechanism of any suitable type known to the art when the reservoir 12 is assembled in a lighter.

The top 24 of the reservoir 12 receives a gas feeding valve assembly indicated generally by the reference character 26. The assembly 26 includes a valve housing 28 sealed to the top 24. This assembly 26 may, for example, be of the type disclosed in my copending application Serial No. 229,865, filed October 11, 1962, for a Regulatable Lighter Valve. As is more completely disclosed in my copending application, the assembly 26 includes a nut 30 which is adapted to be turned to provide a factory flame height adjustment. This member is adjusted at the factory to afford a predetermined maximum flame height. Assembly 26 includes another nut 32 which when the reservoir 12 is assembled in a lighter can be turned by means (not shown) accessible from outside the lighter casing to permit the user to adjust the flame height within the maximum permitted by the factory-made adjustment of nut 30.

The assembly 26 comprises a stem 34 extending upwardly out of the nut 32. If this stem 34 is free, the pressure of gas within the reservoir 12 moves the stem to open the valve to permit the escape of gas out through the top of the nut 32. Normally, however, when the reservoir is assembled in a lighter (not shown) the stem 34 is engaged by a snuffer which is moved by a spring to a position at which the valve assembly 26 is closed.

One form of my valve shut-off device indicated generally by the reference character 10 includes a shank 36 with an enlarged lower end 38 provided with a slot 40 which lends resiliency to the lower end 38. An arm 42 extends laterally from the shank 36 adjacent the upper end thereof. I provide this form of my device with a fingerpiece 44. Through the medium of the fingerpiece 44 the lower end 38 of the shank 36 is adapted to be inserted into the housing 22 so as to engage the housing with a frictional force. When the end 38 has been moved down into the housing 22 through a sufficient distance, arm 42 engages the stem 34 to move the stem downwardly to close the valve assembly 26. I so construct my device that the frictional force with which the end 38 engages housing 32 is great enough to hold valve assembly 26 closed against the pressure of the gas within the reservoir.

In most assemblies of the prior art housing 22 is tubular so that I make the shank 36 cylindrical in shape. I provide my device with an auxiliary arm 46 extending laterally from shank 36 in generally the same direction as does arm 42 and at a location on the shank spaced a short distance below arm 42. I provide the arm 46 with a slot 48 so that as the end 38 is moved down into tube 22 to cause arm 42 to engage stem 34, slot 48 surrounds the nut 32. Thus if the arm 42, for example, is accidentally struck in such way as might cause end 38 to rotate within housing 22 so that arm 42 is moved out of engagement with stem 34, the arm 46 engages nut 32 to prevent this movement. It will be noted that I form the slot 48 of a length sufficient to accommodate different types of lighters.

Referring now to FIGURES 4 and 5 I have shown an alternate form of my shut-off device in which the shank 36 carries a ring 50 at its upper end in place of the fingerpiece 44. In this form of my invention I provide a laterally extending arm 52 with a pair of spaced depending flanges 54 and 56. In this form of my invention as the end 38 moves down into housing 22, arm 52 engages stem 34 and the flanges 54 and 56 are disposed on two sides of the nut 32 to prevent accidental rotation of this form of my device.

In use of the form of my invention shown in FIGURES 1 to 3 inclusive, the reservoir 12 is first filled with liquefied gas such as liquefied butane or the like through the filling valve 20. The regulating nut 30 of the valve assembly 26 is then adjusted to produce the maximum flame height permitted. The adjusting nut 32 is then adjusted to give a normal flame height. The flame is then extinguished and my assembly 10 is then applied by forcing the resilient end 38 into the flint housing 22 by means of the fingerpiece 44. The arm 42 will engage the shut-off valve stem 34 and seat the shut-off valve to seal the gas reservoir 12. The frictional engagement between the resilient end 38 and the wall of the flint housing 22 is such that the shut-off valve is not easily opened owing to the considerable friction between the resilient end 38 and the walls of the flint housing. At the time of the insertion of the resilient end 38 into the flint housing, the arm 46 is so oriented that its slot 48 will embrace the regulating nut 32. It will be observed that while the frictional engagement between the resilient end 38 and the flint tube resists motion along the axis of the shank 36, the lever effect of the arm 42 might cause rotation of the device. This is prevented by the safety arm 46. The slot 48 is made of sufficient length and the arm 42 is sufficiently long so that my valve shut-off device may be used with lighters of the various sizes.

While my device may be formed of any suitable material which will provide the desired resiliency at the split end 38, I can advantageously use a synthetic resin as, for example, a medium density polyethylene.

The operation of the form of my device shown in FIGURES 4 and 5 is substantially the same as that described in connection with the form of my device shown in FIGURES 1 to 3. The only exception is that this form of my device has no auxiliary arm 46 but the function of this arm is performed by the flanges 54 and 56 on the arm 52.

It will be seen that I have accomplished the objects of my invention. I have provided a valve shut-off device for a gas fuel reservoir which permits a filled reservoir to be shipped and handled before final assembly into a lighter. My device accomplishes this result without disturbing the setting of the factory adjustment for flame height. My device is readily installed and removed manually. It is simple in construction and inexpensive to manufacture.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A valve shut-off device in combination with a liquefied gas reservoir having a normally open gas valve with valve shut-off operating means extending out of said reservoir, said reservoir being provided with a housing including in combination a shank adapted to be inserted in said housing, means carried by said shank for frictionally engaging the walls of said housing, an arm carried by said shank for engaging said valve shut-off operating means, said arm being adapted to close said normally open valve, and means carried by said shank for engaging a portion of said gas valve for limiting rotation of said shank around its axis whereby to prevent the movement of said arm out of engagement with said valve shut-off operating means.

2. A device as in claim 1 in which said last named means is a second arm provided with a slot, said second arm carried by said shank in a position at which it embraces said gas valve when said first arm engages said valve shut-off operating means.

3. A device as in claim 1 in which said last named means comprises spaced depending flanges on said arm.

4. A valve shut-off device in combination with a liquefied gas reservoir having a normally open gas valve with valve shut-off operating means extending out of said reservoir, said reservoir being provided with a housing including in combination a shank adapted to be inserted in said housing, said shank being formed with an enlarged bifurcated portion for frictionally engaging the walls of said housing, an arm carried by said shank for engaging said valve shut-off operating means, said arm being adapted to close said normally open valve, and means carried by said shank for engaging a portion of said gas valve for limiting rotation of said shank around its axis whereby to prevent the movement of said arm out of engagement with said valve shut-off operating means.

5. A device as in claim 4 including a fingerpiece carried by said shank.

6. A valve shut-off device including in combination a shank having a longitudinal axis, a first arm carried by said shank and extending in a direction generally perpendicular to said axis, and a second arm formed with a slot, said second arm carried by said shank at a location spaced a short distance from said first arm, said second arm extending generally in the same direction as said first arm.

7. A valve shut-off device including in combination a shank having a longitudinal axis, an arm carried by said shank and extending in a direction generally perpendicular to said axis and a pair of spaced flanges depending from said arm, said flanges extending generally in the direction of said arm.

8. A device in combination with a liquefied gas reservoir having a normally open gas valve provided with a member for closing said valve and having a housing including in combination a shank adapted to be inserted in said housing for frictional engagement therewith, and an arm on said shank for engaging said member to close said valve when said shank is positioned in engagement with said housing.

9. A device in combination with a liquefied gas reservoir having a normally open gas valve with a portion extending out of said reservoir and provided with a member for closing said valve, said reservoir having a housing including in combination means adapted to engage said member to close said valve, means frictionally engaging said housing to position said engaging means to close said valve, and means adapted to engage said valve portion to restrain said valve engaging means against accidental movement to a position at which said valve opens.

10. A device in combination with a liquefied gas reservoir having a normally open valve provided with a member for closing said valve and having a housing including in combination means adapted to engage said member to close said valve and means frictionally engaging said housing to position said member engaging means to close said valve.

11. A device in combination with a liquefied gas reservoir having a normally open valve in a wall thereof including in combination means for closing said normally open valve, means for removably securing said valve closing means on said reservoir in a position to close said valve and means for preventing accidental movement of said valve closing means to a position permitting said valve to open.

12. A device in combination with a liquefied gas reservoir having a normally open valve provided with a member for closing said valve including in combination means adapted to engage said member to close said valve and means for frictionally attaching said valve engaging means to said reservoir in a position at which it engages said member to close said valve.

13. A valve shut-off device in combination with a liquefied gas reservoir having a normally open gas valve with valve shut-off operating means extending out of said reservoir, said reservoir being provided with a housing having a wall, including in combination a shank adapted to be inserted in said housing, a relatively rigid laterally extending arm unitary with said shank for engaging said valve shut-off operating means when said shank is in-inserted in said housing, means carried by said shank for frictionally engaging the walls of said housing to retain said shank in said housing with a force sufficient to cause said arm engaging said operating means to close said normally open valve and means carried by said shank for engaging said valve to limit rotation of said shank around its axis to prevent accidental movement of said arm out of engagement with said valve shut-off operating means in response to rotation of said shank.

References Cited by the Examiner
UNITED STATES PATENTS 2,664,727   1/54   Gehrie.
3,063,276  11/62   Cassan.
3,092,988   6/63   Meyers.

FOREIGN PATENTS 1,056,407   4/59   Germany.

LOUIS J. DEMBO, *Primary Examiner.*
EDWARD J. MICHAEL, *Examiner.*